United States Patent [19]

Lauffer

[11] Patent Number: 4,862,781
[45] Date of Patent: Sep. 5, 1989

[54] CIRCULAR SAW

[75] Inventor: Adelbert Lauffer, Reutlingen, Fed. Rep. of Germany

[73] Assignee: Chr. Eisele Maschinenfabrik GmbH & Co. KG, Kongen, Fed. Rep. of Germany

[21] Appl. No.: 210,576

[22] Filed: Jun. 23, 1988

[30] Foreign Application Priority Data

Jun. 30, 1987 [DE] Fed. Rep. of Germany ....... 3721471

[51] Int. Cl.⁴ .................... B27B 5/18; B23D 45/04
[52] U.S. Cl. .................. 83/477.1; 83/477.2; 83/490; 83/483; 83/597
[58] Field of Search ............. 83/477.1, 477.2, 490, 83/469, 471, 471.2, 491, 597, 483

[56] References Cited

U.S. PATENT DOCUMENTS

| 4,336,733 | 6/1982 | Macsoud | 83/477.2 |
| 4,510,835 | 4/1985 | Cromeens | 83/477.2 X |
| 4,532,844 | 8/1985 | Chang et al. | 83/477.1 |

Primary Examiner—Donald R. Schran
Attorney, Agent, or Firm—John C. Evans

[57] ABSTRACT

A circular saw comprises a machine structure, a gearbox, a motor-driven circular saw blade rotationally mounted on the gearbox and a pivot shaft on which the gearbox is pivotably supported. The pivot shaft is firmly connected at one end to the machine structure and is mounted at the other end in two brackets which form an angle between them. Each of these brackets is adjustable by means of an eccentric bearing rotatably mounted on the machine structure in such a way as to allow adjustment of the pivot shaft and with it the circular saw blade in the direction of two coordinates.

4 Claims, 3 Drawing Sheets

CIRCULAR SAW

The invention relates to a circular saw comprising a machine structure, a gearbox, a motor-driven circular saw blade which is rotationally mounted on the gearbox, and a pivot shaft which is arranged on the machine structure and on which the gearbox is pivotably supported.

In circular saws of this kind, it is necessary to adjust the plane of the circular saw blade in two directions to achieve a proper, clean, plane cut on the workpiece.

The object of the invention is to indicate simple means for carrying out such adjustment of the saw blade quickly and conveniently.

The object is achieved in a generic circular saw by the pivot shaft being firmly connected at one end to the machine structure and mounted at the other end in two brackets forming an angle between them, and by each of these brackets being adjustable by means of an eccentric bearing rotatably mounted on the machine structure in such a way as to allow adjustment of the pivot shaft and with it the circular saw blade in the direction of two coordinates.

The following description of a preferred embodiment serves in conjunction with the appended drawings to explain the invention in further detail.

Figure 1:
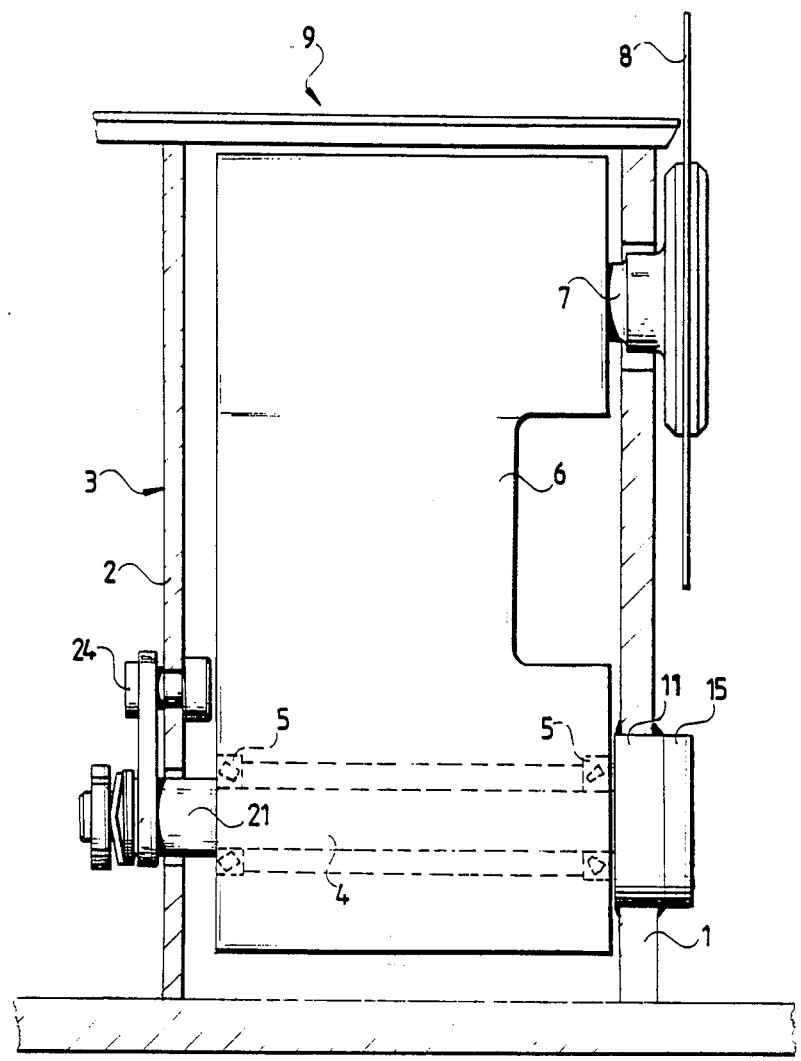
FIG. 1 is a schematic representation of a circular saw with a pivotable circular saw blade.

A pivot shaft 4 is mounted on two plates 1, 2 of a stationary machine structure 3 in a manner described below. A gearbox 6 is supported by means of bearings 5 on the pivot shaft 4 for pivotal motion about the pivot shaft. The free end of a saw shaft 7 which is rotatingly mounted in the gearbox 6 and is driven in a known way by a drive motor extends laterally from the gearbox. A circular saw blade 8 is connected in a known way to the free end of the saw shaft 7 for rotation with the saw shaft. When the gearbox 6 and with it the rotating circular saw blade 8 are pivoted about the pivot shaft 4, workpieces placed on a workpiece support 9 of the machine structure 3 can be parted, in which case, it is important for the circular saw blade 8 to be precisely oriented with respect to the workpiece support 9.

Figure 2:
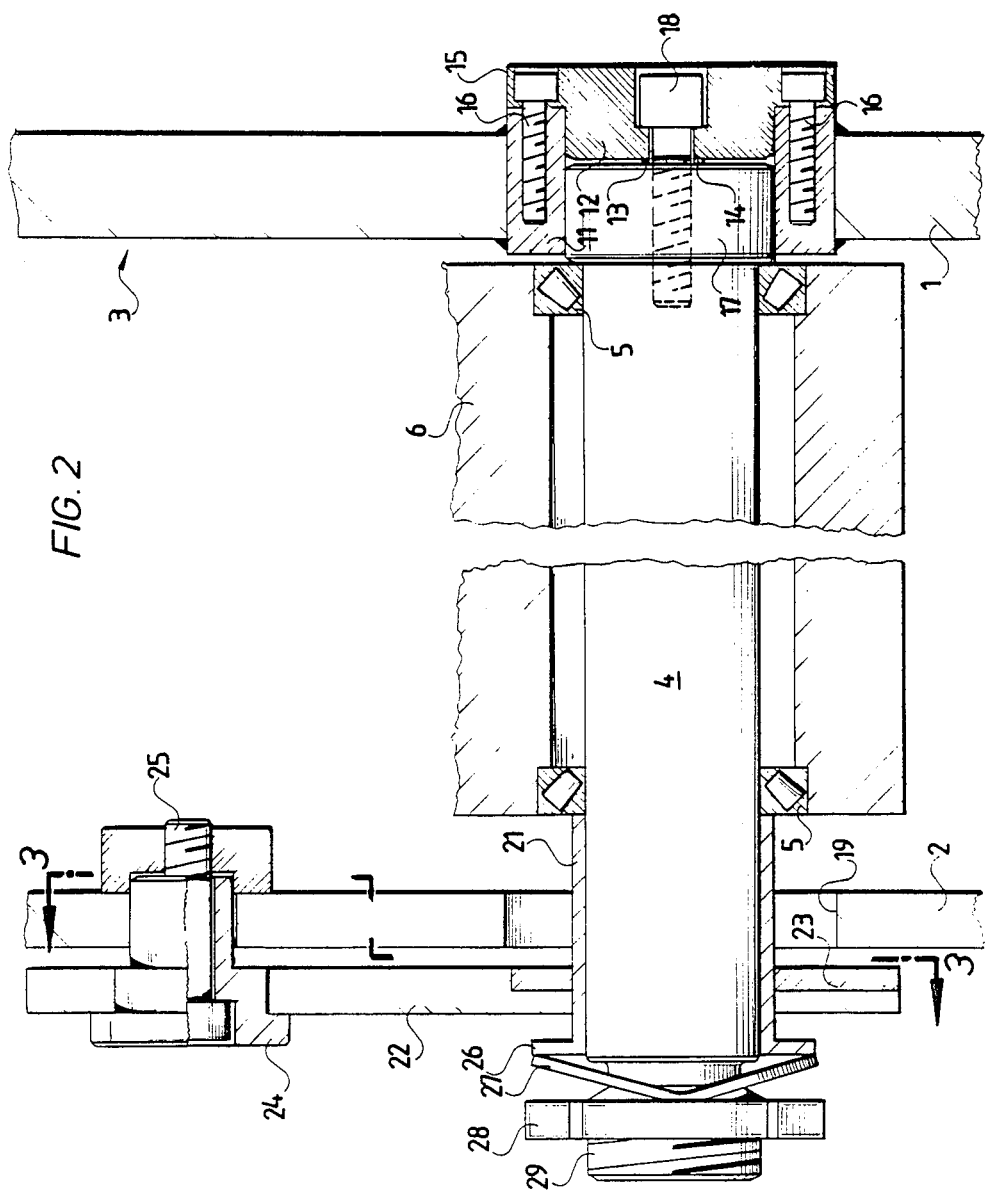
FIG. 2 is a sectional detail view of the machine of FIG. 1 in the area of the pivot shaft.

FIG. 2 shows details of how the pivot shaft 4 is mounted on the plates 1, 2 of the machine structure 3. A circular, cylindrical bushing 11 is welded into a corresponding cutout section in plate 1. A shaft stub 12 extends partially into this bushing, with a cylindrical projection 13 with a substantially plane end face 14 protruding centrally from the end face of the shaft stub 12. The collar 15 on the shaft stub 12 is firmly bolted to the bushing 11 by means of threaded bolts 16.

A cylindrical section 17 of the pivot shaft 4 fits smoothly into the bushing 11 from the side opposite the shaft stub 12. The shaft stub 12 and the cylindrical section 17 are bolted together by means of a centrally located threaded bolt 18, with the end face of the cylindrical section 17 contacting the end face 14 of the projection 13 formed on the shaft stub 12. The bolt 18 simultaneously connects the end of the pivot shaft 4 formed by the cylindrical section 17 firmly to the machine structure 3.

The plate 2 located opposite the plate 1 has a cut-out section 19 with a comparatively large diameter which is freely penetrated with considerable clearance by the pivot shaft 4 and a thrust sleeve 21 arranged on the pivot shaft. On the outer side of plate 2, two brackets 22, 23 forming an angle exceeding zero degrees, preferably an angle of 90 degrees, fit precisely onto the sleeve 21. As shown, for example, in the case of bracket 22 in FIG. 2, both brackets 22, 23 are rotatably mounted at one end on eccentric bushings 24 which, in turn, can be eccentrically rotated with respect to threaded bolts 25 fixed on plate 2. By means of rotation of the eccentric bushings 24, the brackets 22, 23 can be individually displaced generally parallel to their lengthwise extension. Such displacements enable adjustment of the pivot shaft 4 and ultimately the circular saw blade 8 in two coordinate directions since the two brackets 22, 23 via the thrust sleeve 21 represent the second bearing for the pivot shaft 4 located opposite the bearing at the cylindrical section 17.

Figure 3:
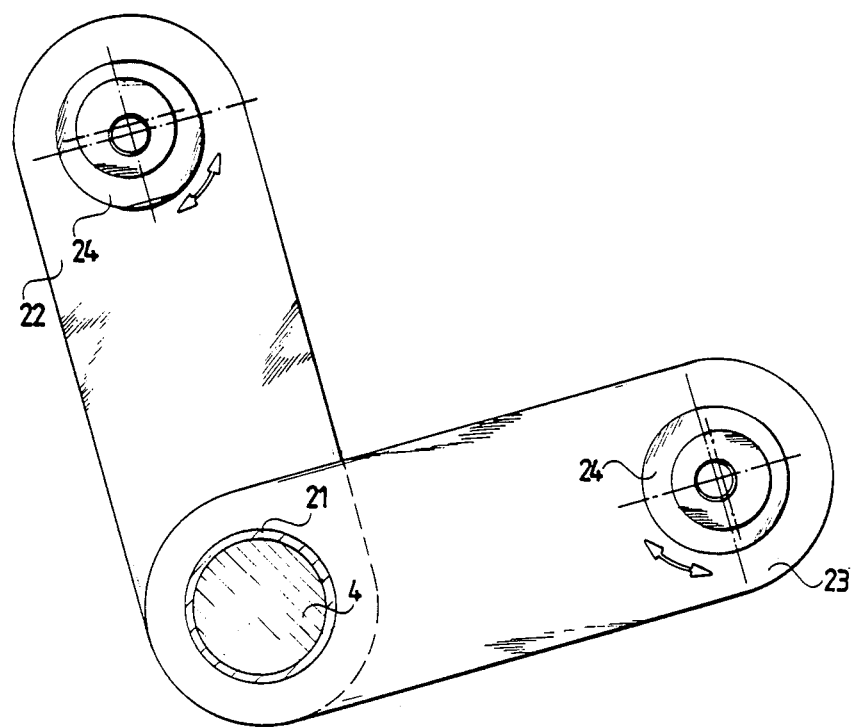
FIG. 3 is a sectional view taken along line 3—3 in FIG. 2.

As shown in FIG. 3, the two brackets 22, 23 mutually overlap in the area of the thrust sleeve 21 and are dimensioned in the overlapping area so as to have approximately half of their general thickness only.

It has been demonstrated in practice that in spite of the end of the pivot shaft 4 formed by the cylindrical section 17 being firmly connected to the machine structure 3, adjustment motions of the opposite shaft end can be achieved by means of the brackets 22, 23 in the required adjustment range which is usually, for example, only a few hundredths of a millimeter or less, in which case, the shaft 4 may bend slightly.

As shown in FIG. 2, the bearings 5 supporting the gearbox 6 on the pivot shaft 4 are implemented in a known way as antifriction bearings providing combined radial and axial support, for example, as tapered roller bearings or as ball bearings with inclined races. The use of such bearings allows preloaded support of the gearbox 6 on the pivot shaft 4 permanently without play. The tapered roller bearing or ball bearing with inclined race at the right-hand end of the pivot shaft 4 in FIGS. 1 and 2 is enclosed by the cylindrical section 17 of the pivot shaft 4 and by the gearbox 6. The bearing 5 at the left-hand end of the pivot shaft 4 in FIGS. 1 and 2 is enclosed by the gearbox 6 and the thrust sleeve 21. The thrust sleeve 21 carries a flange 26 with a spring element 27 in the form of a Belleville spring engaging it. As illustrated, the Belleville spring 27 bears against a nut 28 on a threaded end section 29 of the pivot shaft 4. The complete assembly consisting of the pivot shaft 4, the gearbox 6 and the thrust sleeve 21 is thereby permanently preloaded without play.

The present disclosure relates to the subject matter disclosed in German Application No. P 37 21 471.3 of June 30, 1987, the entire specification of which is incorporated herein by reference.

What is claimed is:

1. A circular saw comprising a machine structure, a gearbox, a motor-driven circular saw blade which is rotationally mounted on said gearbox, and a pivot shaft which is arranged on said machine structure and on which said gearbox is pivotably supported, characterized in that said pivot shaft (4) is firmly connected at one end (17) to said machine structure (3) and is mounted at the other end (29) in two brackets (22, 23) forming an angle between them, and in that each of these brackets (22, 23) is adjustable by means of an eccentric bearing (24) rotatably mounted on said machine structure (3) in such a way as to allow adjustment of said pivot shaft (4) and with it said circular saw blade (8) in the direction of two coordinates.

2. A circular saw as defined in claim 1, characterized in that a thrust sleeve (21) is arranged between said pivot shaft (4) and said brackets (22, 23).

3. A circular saw as defined in claim 2, characterized in that said gearbox (6) is mounted on said pivot shaft (4) by two tapered roller bearings or ball bearings (5) with inclined races, in that one of these bearings (5) is enclosed between a cylindrical section (17) of said pivot shaft (4) and said gearbox (6) and the other one of these bearings (5) is enclosed between said gearbox (6) and said thrust sleeve (21), and in that a spring element (27) which permanently preloads the complete assembly without play is arranged between said thrust sleeve (21) and said pivot shaft (4).

4. A circular saw as defined in claim 3, characterized in that said spring element (27) is a Belleville spring.

* * * * *